United States Patent [19]
Ertola

[11] Patent Number: 5,723,770
[45] Date of Patent: Mar. 3, 1998

[54] TAPPING TEE PRESSURE TEST RESTRAINING KIT

[76] Inventor: Peter F. Ertola, 80-12 54th Ave., Elmhurst, N.Y. 11373

[21] Appl. No.: 740,250

[22] Filed: Oct. 25, 1996

[51] Int. Cl.$^6$ ................................................ C05B 1/00
[52] U.S. Cl. ................................. 73/41; 73/40.5 R
[58] Field of Search .................. 73/37, 40, 40.5 R, 73/40.7, 49.1, 49.2, 49.5, 49.6, 49.8; 138/90, 104; 137/343, 375, 377, 559

[56] References Cited

U.S. PATENT DOCUMENTS

| 1,744,887 | 1/1930 | Gruene | 73/40.5 R |
| 4,638,834 | 1/1987 | Montgomery | |
| 4,761,024 | 8/1988 | Ewen | |
| 4,813,456 | 3/1989 | Emmitte, Jr. | 73/49.6 |

Primary Examiner—Robert Raevis
Attorney, Agent, or Firm—Brooks Haidt Haffner & Delahunty

[57] ABSTRACT

Method and apparatus, in the form a kit of parts, for securing and restraining the threaded brass adapter bushing of a standard pressure tester in its threaded engagement within the riser of a tapping tee on a gas main during pressure testing of the main, to prevent blow-off of the bushing. The assembled parts provide a swivel plate having respective connection rod apertures at its opposite ends and mounted loosely via an enlarged central aperture on the nipple of the tester immediately adjacent to the adapter bushing which is threaded onto, and holds the swivel plate on the nipple; an elongated angular saddle plate placed against the gas main below the tapping tee and having diagonally disposed connection rod apertures corresponding to those in the swivel plate; and a pair of threaded connection rods passed through the respective corresponding pairs of apertures and tightly connecting the swivel plate and saddle plate. The angular positioned swivel plate and diagonal disposition of the saddle plate apertures causes the rods to bypass the horizontal branch of the tapping tee. The swivel plate is pressed into engagement with the tester bushing, thereby preventing blowoff. In an alternative embodiment, a wire rope is substituted for the pair of connection rods.

14 Claims, 4 Drawing Sheets

1

TAPPING TEE PRESSURE TEST RESTRAINING KIT

FIELD OF THE INVENTION

This invention relates to safety devices and techniques used in connection with gas mains and other pipelines and, more particularly, to a safety device and method for preventing blowoff of the standard threaded brass adapter bushing, which is a part of a standard gas pressure test apparatus, from the top of a pipe tapping tee into which the bushing is normally threaded, while the test apparatus is being used to pressure test a length of the pipeline on which the tapping tee is attached.

BACKGROUND OF THE INVENTION

Conventional gas mains and other pipelines must be pressure tested either at the time of installation or during routine maintenance to locate leakage points and to otherwise test the pressure-worthiness of the pipe. Such pressure testing is usually done by connecting a pressure test apparatus to the open top of the riser portion of a service line tapping tee which is attached to the gas main or pipeline. After a length of the pipeline has been isolated and the horizontal branch portion of the tee has been closed off, air or inert gas under pressure is introduced through the test apparatus into the pipeline at a gage pressure of from about 90 to about 150 pounds per square inch (psig) for a period of time up to about two hours.

The standard pressure testing apparatus is connected to the tapping tee via an externally threaded brass adapter bushing, which fits and is threaded into the internally threaded open top end of the riser portion of the tee. The test air is introduced into the pipeline via a gas pipe nipple which passes through the adapter bushing when so connected to the tee. Typical polyethylene gas mains have a nominal pipe diameter of from 1¼" to 12". If the gas main has a typical 2" diameter tapping tee, a pull out or blow out force of about 450 lbs. is exerted upwardly on the brass adapter bushing, tending to blow it off, when the line is tested using 150 psig air pressure.

Either because of improperly engaged or worn threads on either the adapter bushing or the pipe tee, or upon unintended heat expansion of the plastic pipe tee, during application of the air pressure the brass adapter bushing may unexpectedly blow off from the tee riser, whereupon the suddenly released gas blows off the entire air tester apparatus. When such occurs, it is apparent that persons in the vicinity may be injured by the high speed flying parts, and the test apparatus, or the tapping tee, or the gas main can be damaged.

Accordingly, there is need for a safety device for securing and restraining the threaded tester adapter bushing in place on the pipe tapping tee during such pressure testing of the pipe to which the tee is attached. The safety device must be capable of quick and secure attachment to the pressure tester and the tee, and must be portable and otherwise capable of convenient detachment from the tester and tee for reuse. For example, when employed by public utility pipeline installers and maintenance crews, the safety device should be a part of the standard equipment of the crew as it travels between job locations. In addition, the device should be easily installed in narrow spaces as, for example, on a pipeline which lies within a narrow trench.

BRIEF DESCRIPTION OF THE INVENTION

The invention provides a method of securing and restraining the aforementioned standard threaded brass adapter bushing of a standard air or inert gas pressure test set-up when the bushing is in place in threaded engagement within the vertical riser portion of a tapping tee on the length of gas main or other pipeline which is being pressure tested, and the restraining device which is used to secure and restrain the adapter bushing. The device is provided as an easily assembled kit of parts for attachment to the pipe tester and to the pipe, as will be apparent from its description. The principal parts are made of lightweight aluminum so that the kit is portable and assemblable in place by only one person; even under circumstances where the pipeline lies within a narrow dirt trench or other confining space.

Briefly describing the invention in its preferred embodiment, the kit of parts includes a swivel plate for mounting loosely on the air nipple of the pressure testing apparatus; a particularly shaped and apertured saddle plate; and a pair of threaded connection rods and wingnuts for tightly connecting the swivel plate to the saddle plate in their assembled condition on the pipeline, pipe tapping tee, and pressure tester. In an alternative embodiment a wire rope, with an attached bolthead at one end and a threaded straight shank at its other end, is substituted for the pair of straight connection rods for joining the swivel plate and the saddle. The arrangement is such that the device bypasses the laterally extending horizontal branch portion of the pipe tee, so that the branch of the tee does not interfere with the function of the safety device. The swivel plate is mounted for freely pivotal movement on the air tester pipe nipple at a location above the top surface of the brass adapter bushing so that, when the device is assembled on the pipeline, the swivel plate presses downwardly on, and thereby secures and restrains the adapter bushing in its engagement with the riser portion of the pipe tee. Thus, the bushing cannot be blown off the tee, even if it is not properly engaged on the tee.

DESCRIPTION OF THE DRAWINGS

These and other objects, features and advantages will be more fully understood from the following detailed description of the invention, when read with reference to the accompanying drawings, in which.

DETAILED DESCRIPTION OF PREFERRED EMBODIMENTS

Figure 1:
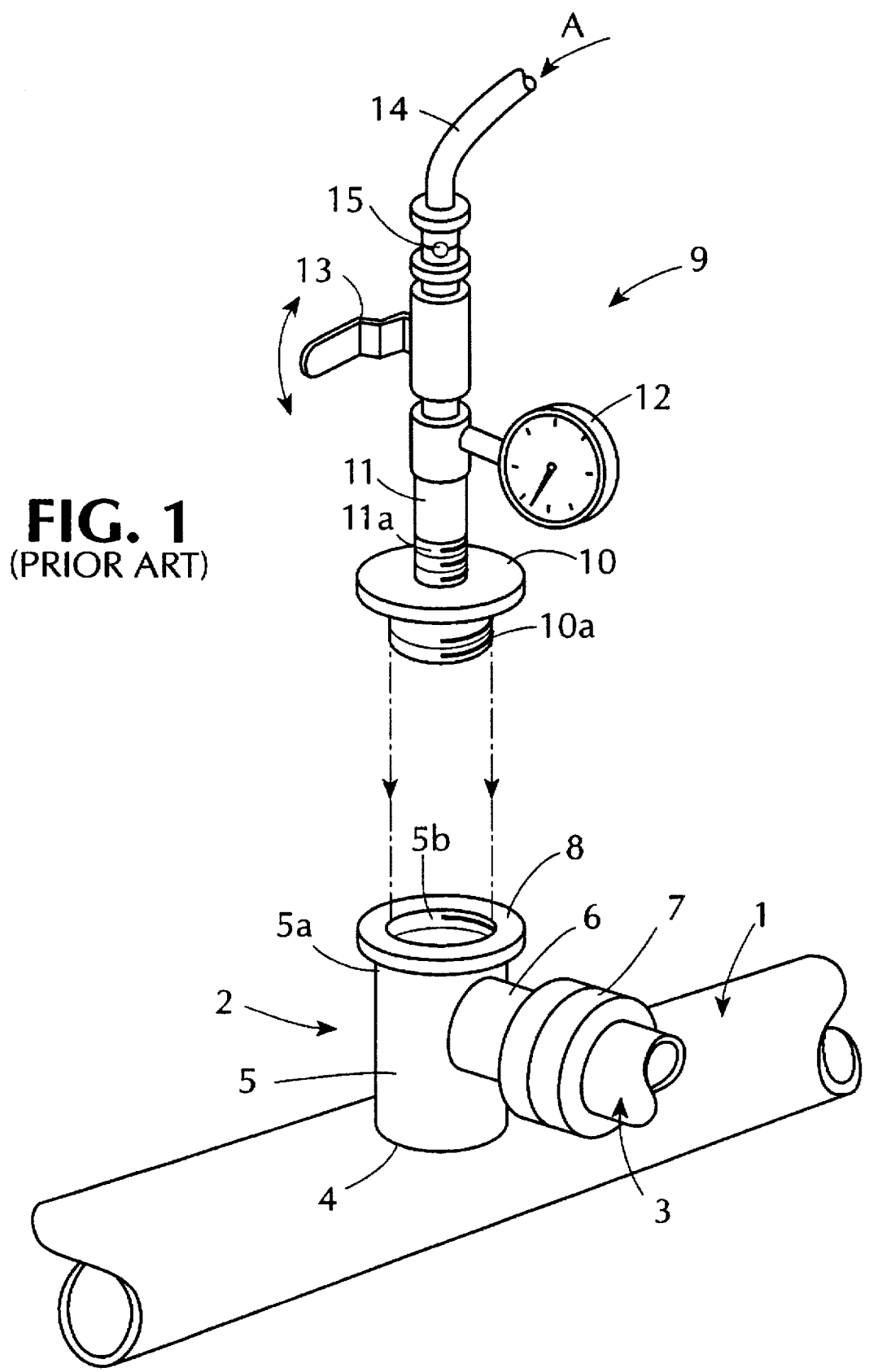
FIG. 1, labeled "Prior Art", is a fragmentary and exploded perspective view showing a standard air pressure tester and the manner of its connection to the open vertical riser portion of a typical service line tapping tee on a standard gas main, which connection the present invention is intended to secure and restrain.

A typical air tester set up for pressure testing a gas main or other pipeline is illustrated in FIG. 1. The pipeline or gas main 1, which may be made of polyethylene plastic, is isolated by shut-off valves (not shown) between which, for example, a 40' length of pipeline may be pressure tested. The gas main 1, typically 8" in diameter, has an attached tapping tee, generally indicated by reference numeral 2 and also made of polyethylene plastic, for connecting another pipeline to the gas main 1, such as the gas service line 3 for bringing gas from the main into a building (not shown). The tapping tee 2 is attached by plastic welding 4 to the gas main 1 and has a vertically extending riser portion 5 and a horizontally extending lateral outlet or branch portion 6 to which the service line 3 is attached at attachment flanges 7. The riser portion 5 has a peripherally extending flange 8 at its open top end 5a, and is internally threaded as indicated by reference numeral 5b. The top end 5a is normally closed by a threaded plug and cap (not shown).

When the isolated length of gas main 1 is to be pressure tested for leaks and the like, the service line 3 is closed by a downstream shut off valve (not shown) and an air pressure tester, generally indicated by reference 9, is attached to the open top end 5a of the vertical leg or riser portion 5 of the tapping tee 2 using the conventional brass adapter bushing 10 which is a part of the air tester 9. The bushing 10 is externally threaded, as at 10a, and is sized to threadedly engage the internal threads 5b at the open top end 5a of the tee riser portion 5, as indicated by dotted lines and arrowheads in FIG. 1. The adapter bushing 10 also has internal threads (not shown) which engage external threads 11a of the air pipe or nipple 11. An air pressure gage 12 and an air shut off valve 13 are connected to the air pipe nipple 11, through all of which air A under pressure is introduced into the pipeline 1 via the air hose 14 which is coupled to the shut off valve 13 by a coupling 15, as shown.

Figure 3:
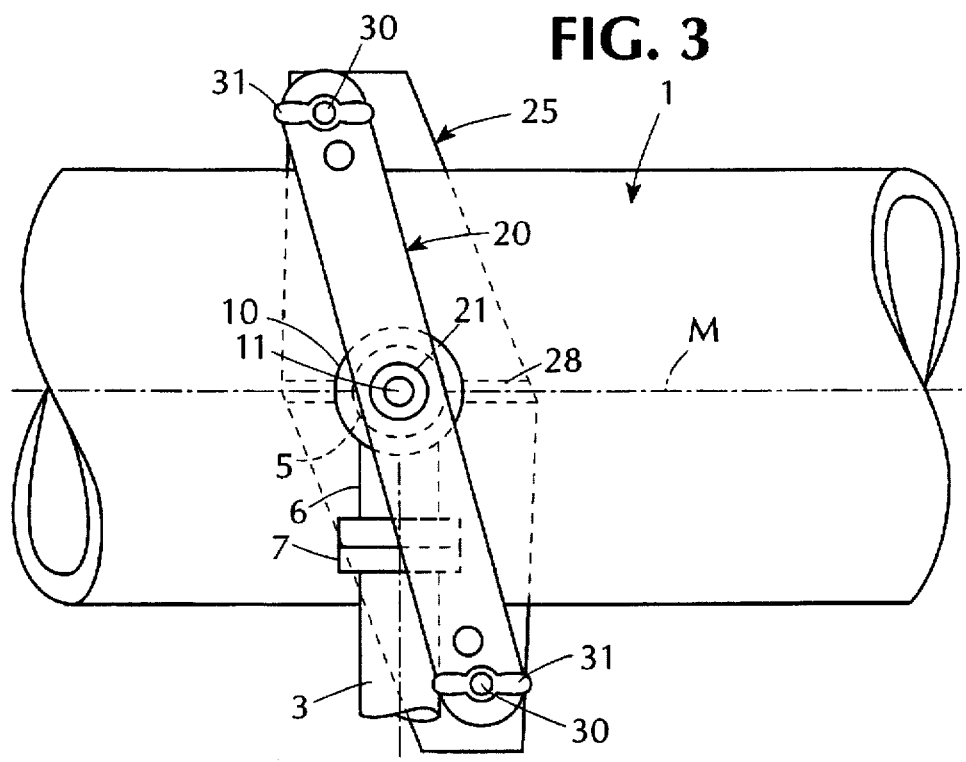
FIG. 3 is a fragmentary plan view of the installed safety device as seen from line 3—3 in FIG. 2.
Figure 4:
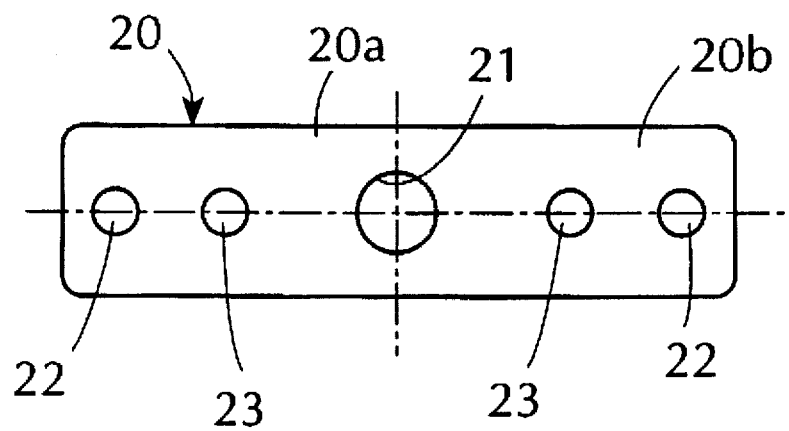
FIG. 4 is a plan view of the swivel plate element of a safety device in accordance with the invention.

However, before the air tester set-up 9 is connected to the tapping tee 2 of the main 1, its brass adapter bushing 10 is unscrewed from the threads 11a of the ½" diameter nipple 11 so that a ¼" thick aluminum swivel plate 20, as illustrated in FIG. 4, can be loosely mounted on the pipe nipple 11 via a ⅞" diameter central circular opening 21 in the swivel plate. The brass adapter bushing 10 is remounted by threading it on to the tester nipple 11 from the underside of the swivel plate 20 so that, after the bushing 10 is attached, the laterally extending swivel plate 20 is freely swivelable about the axis of the nipple 11 along the length of the nipple between the adapter bushing 10 and the air pressure gauge 12, as will be apparent from FIG. 3. It will be noted that the swivel plate 20 need not be taken off the nipple 11 after each use of the pressure tester 9, but may remain mounted on the pipe nipple 11 as the tester apparatus 9 is brought to the next location of a pipe pressure test.

With the swivel plate 20 so connected, the air tester 9 is attached to the tapping tee 2 in usual manner, by screwing the threads 10a of the adapter bushing 10 into the threads 5b within the upper end of the riser portion 5 of the tapping tee 2, the air hose 14 being not yet attached to the tester 9 at the coupling 15. The connected air tester 9 and tapping tee 2, with the swivel plate 20 mounted on the pipe nipple 11 of the tester, then appear as shown in FIG. 2.

Figure 2:
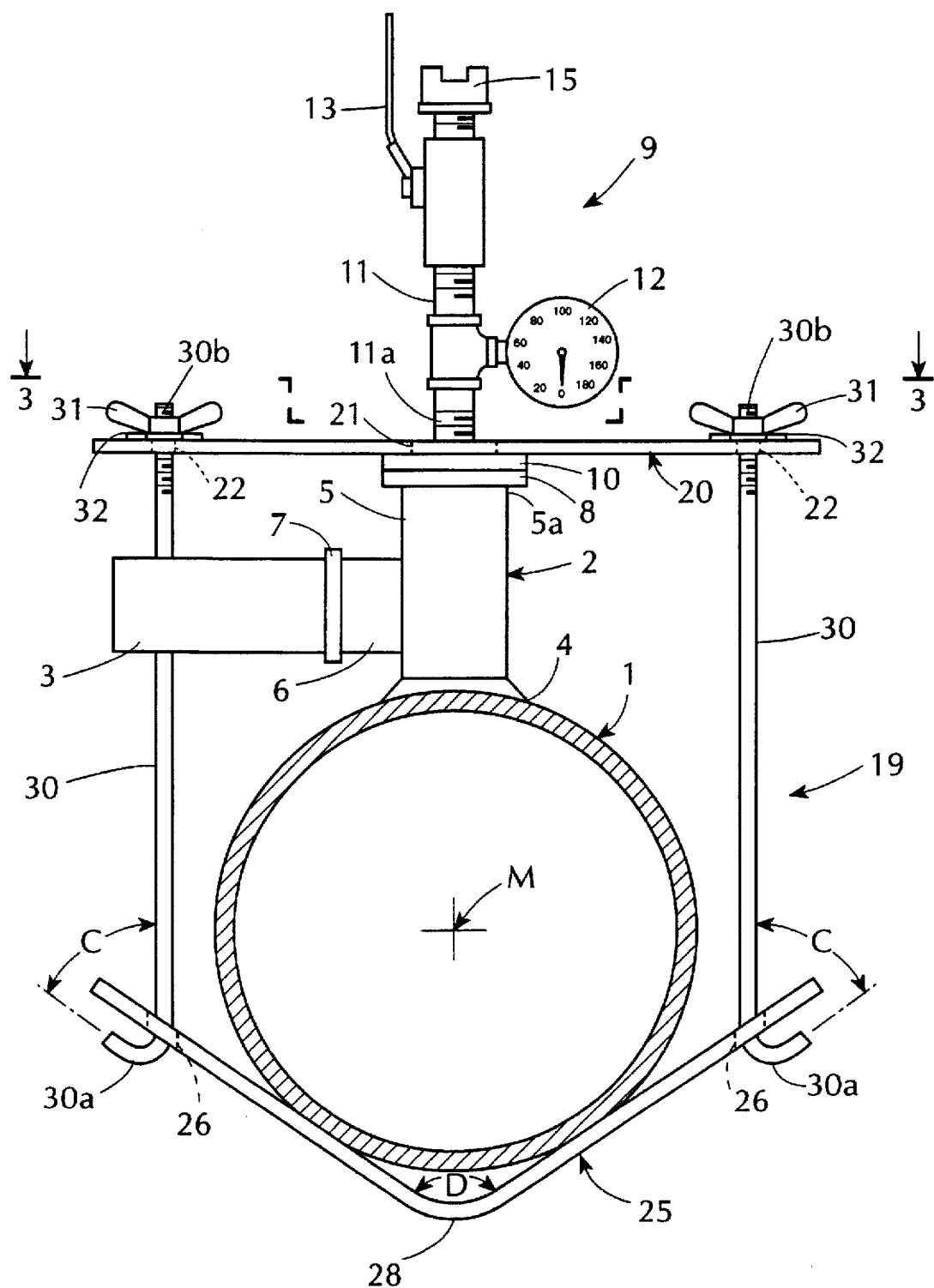
FIG. 2 is a vertical cross-sectional showing of a gas main and service line tee similar to that of FIG. 1, on which the safety device of the present invention has been installed.
Figure 5:
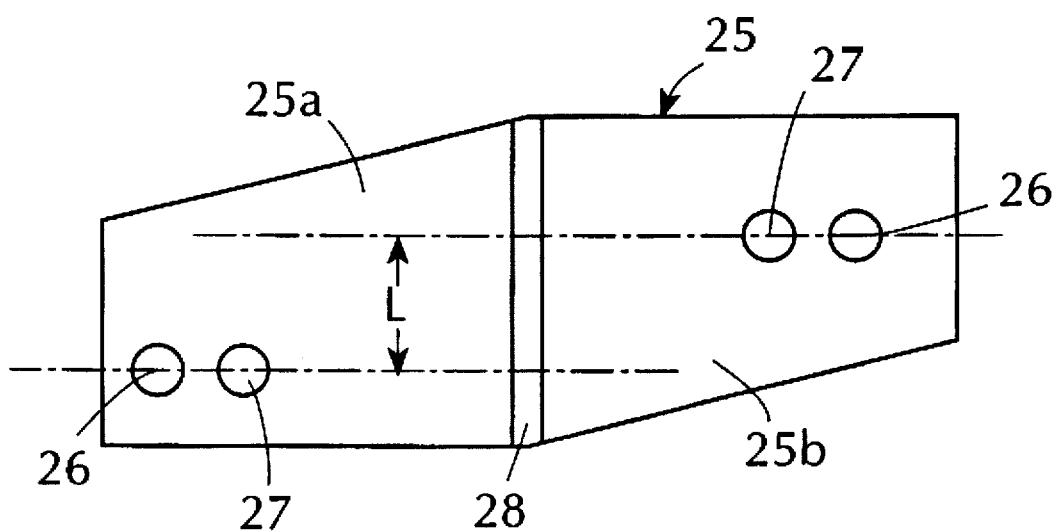
FIG. 5 is a plan view of a saddle plate element of a safety device in accordance with the invention.

The swivel plate 20 is one part of the kit of parts which, when the remaining parts are assembled as shown in FIG. 2, provides the safety device 19 of the invention in assembled condition encompassing the tester adapter bushing 10, the pipe tapping tee 2, and the pipeline or gas main 1 to which the tapping tee is attached by welding 4. The remaining parts of the kit are a ¼" thick, angular-shaped aluminum saddle plate 25 as illustrated in FIGS. 2 and 5, and a pair of ⅜" threaded bolts or connection rods 30 with matching threaded wingnuts 31 and washers 32. Each connection rod 30 is bent at its lower end to form what is known as a crowsfoot 30a, the bending of the rod being over about 135 degrees to form an included crowsfoot angle C of about 45 degrees.

Referring again to FIG. 4, on the respective opposite sides of its central aperture 21 the swivel plate 20 is defined by a pair of end portions 20a, 20b, each of which has a ½" diameter connection aperture 22 therethrough. The connection apertures 22 are respectively adjacent to the outer ends of the swivel plate end portions and, as seen in FIG. 2, receive the respective ⅜" diameter connection rods 30 when the swivel plate is swiveled to an angular location with respect to the transverse direction of the main 1, with its end portions 20a, 20b positioned diagonally on either side of the tee branch portion 6, as shown in FIG. 3.

With reference to FIG. 5, the ¼" thick aluminum, angular-shaped saddle plate 25 has a pair of ½" diameter connection apertures 26 therethrough, respectively within each of its opposite end portions 25a, 25b for receiving the respective crowsfeet 30a of the connection rods 30, as seen in FIG. 2. The angular saddle plate has a longitudinal bend 28 which forms the angle between its opposite flat end portions 25a, 25b, the included angle D therebetween being from about 90 degrees to slightly less than 180 degrees, preferably about 120 degrees as shown in FIG. 2. The angular saddle plate 25 is placed against the bottom of the gas main 1, directly beneath the service tee 5 and swivel plate 20, as will be understood from a comparison of FIGS. 2 and 3. The central longitudinal bend line 28 then lies parallel to the longitudinal central axis M of the gas main 1, as indicated in FIGS. 2 and 3 with the included angle D facing the main 1.

When the saddle plate 25 is so positioned, the saddle and swivel plates are connected and secured together using the pair of threaded connection rods 30, the crowsfeet 30a being respectively received in the saddle plate apertures 26, and the threaded opposite ends 30b being passed respectively through apertures 22 of the swivel plate 20 and secured by the threaded wingnuts 31 and washers 32 above the apertures. The arrangement is tightened so that the angular saddle plate is braced against the opposite side of the main 1 to cause downward pressure at the central area of the swivel plate 20 to act on the outer surface of the brass adapter bushing 10 to secure and restrain it in its threaded engagement within the upper end 5a of the riser portion 5 of the tapping tee 2. Of course, for the swivel plate 20 to exert such pressure its central aperture 21 (FIG. 4) must be smaller than the diameter of the bushing 10.

As will be understood by a comparison of FIGS. 3 and 5, because of the longitudinally skewed locations of the respective saddle plate connection apertures 26 with respect to each other, they are respectively positioned diagonally on the opposite side of the projected length of the branch tee 6 of the tapping tee 2, as are the aligned connection aperture 22 of the similarly diagonally positioned swivel plate 20, which permits the vertically connected connection rods 30, which join the saddle plate 25 to the swivel plate 20, to clear and pass the branch tee 6 and its attached service line 3. Their respective crowsfeet 30a are then easily received in the respective saddle plate apertures 26 therebelow, as shown. The loose fit of the swivel plate 20 enables lateral swiveling movement of the swivel plate about the air tester nipple 11 before it is connected to the saddle plate, so that its end-adjacent apertures 22 are easily positioned vertically above the corresponding end-adjacent apertures 26 of the saddle plate 25 therebelow. The tester adapter bushing 10 is then securely restrained by the force exerted thereon by the swivel plate, and cannot blow off from the tapping tee 2 even if, due to thread wear or environmental heat expansion of the tapping tee, its threads 10a are not in secure engagement with the internal threads 5b of the riser portion 5 of the tapping tee.

Figure 6:
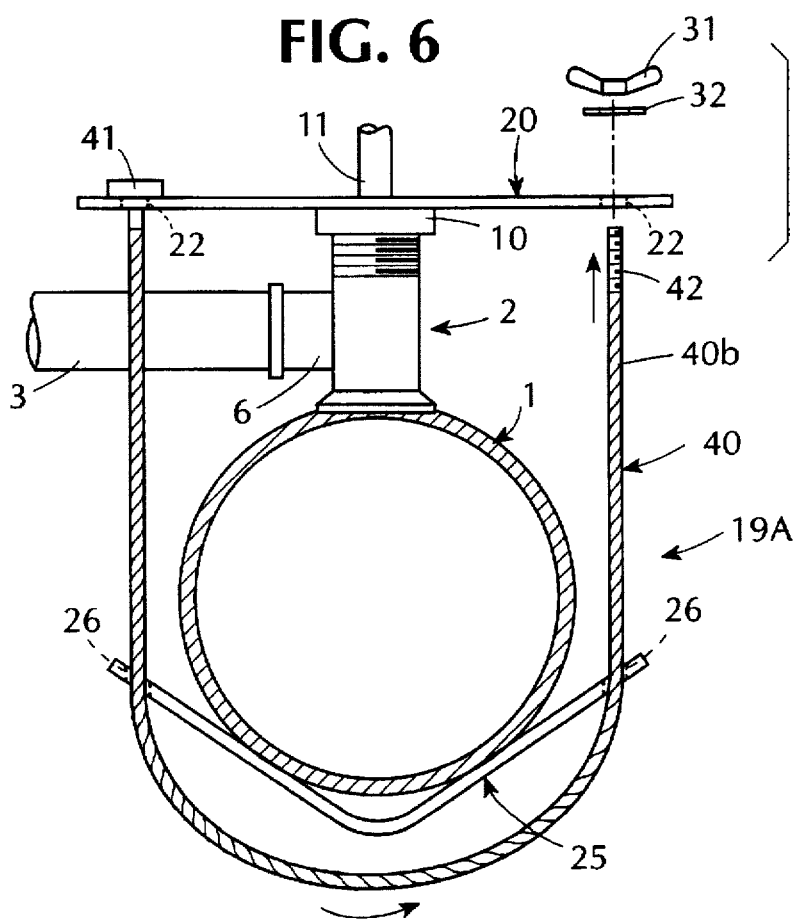
FIG. 6 is a view similar to FIG. 2, illustrating an alternative embodiment of the invention.

As illustrated in FIG. 6, in an alternative embodiment a ⅛" diameter wire rope 40, having a bolthead 41 secured on one end 40a and a threaded straight boltshaft or shank 42 secured on its other end 40b, is substituted for the pair of threaded connection rods 30 in the first embodiment. Thus, after connection of the adapter bushing 10 to the tapping tee 2 with the swivel plate 20 mounted on the air tester nipple 11 thereabove, and after the saddle plate 25 has been positioned along the bottom of the gas main 1 directly beneath the tapping tee 2, the straight threaded shank 42 at the end 40b of the wire rope 40 is passed through one of the ½" diameter swivel plate apertures 22 and downwardly through the corresponding ½" diameter saddle plate aperture 26 on the same side of the gas main 1 so that the bolthead 41 at its opposite end 40a engages the swivel plate 20 as a wire rope stop, as illustrated in FIG. 6. The wire rope 40 is then passed beneath the saddle plate 25 whereupon the threaded shank 42 at its end 40b is passed upwardly through the ½" diameter saddle aperture 26 on the opposite side of the main 1, and thence upwardly through the other aligned ½" diameter saddle aperture 22, as indicated by the arrow in FIG. 6. A washer 32 is placed on the threaded shank 42 and a wingnut 31 is then threaded onto the shank 42 to thus secure the safety device 19A in its encompassing, tightened condition about the tester adapter bushing 10, tapping tee 2 and gas main 1, as in the first embodiment.

As illustrated in FIG. 5, it will be understood that the longitudinal distance L between the connection apertures 26 on either side of the saddle plate line of bend 28 must be at least equal to, and preferably greater than the diameters of the branch tee 6 and service line 3, so that the connection rods 30 pass freely downwardly alongside the branch tee 6 or service line 3 when the safety device 19 is installed. It will also be noted that the opposite saddle plate end portions 25a and 25b, including their respective connection apertures 26, are equal in length, so that the saddle plate 25 is properly positioned with its apertures 26 respectively spaced longitudinally from, and on opposite sides of the branch service line 3 regardless of which way the saddle plate is faced along the bottom surface of the gas main 1.

The swivel plate 20 and angular saddle plate 25 may each have additional respective and corresponding pairs of connection apertures, these being connection apertures 23 in swivel plate 20 and connection apertures 27 in saddle plate 25, so that the safety device 19 or 19A is thereby adapted for use on a smaller diameter gas main 1. Of course, more than one of such additional pairs of connection apertures may be provided, to adapt the device 19 or 19A for use on a number of differently sized pipelines.

Thus has been described a tapping tee pressure test restraining kit which, when assembled in accordance with the inventive method on a gas main or other pipeline, having a tapping tee, provides a safety device which will restrain and secure the tester adapter bushing on the tapping tee, achieves all of the objects of the invention.

What is claimed is:

1. A method of restraining the adapter bushing of a pressure tester against blow off from its connection on a tapping tee of a pipeline during pressure testing of the pipeline, said adapter bushing having an outer top surface and being removably mounted on the lower end of a pipe nipple of said tester, comprising the steps of mounting an elongated swivel plate on said nipple adjacent to said bushing top surface, said mounting being centrally of the length of said swivel plate to provide opposite swivel plate end portions extending on either side of said nipple and positionable in a generally transverse direction of said pipeline whereby said end portions respectively project laterally outward of the opposite sides of said pipeline, and using means braced against the opposite side of said pipeline to tighten said swivel plate end portions to press said swivel plate against said outer top surface of said bushing and restrain said bushing in its said connection on said tapping tee.

2. A method according to claim 1, wherein said step of mounting said elongated swivel plate on said nipple comprises first removing said tester adapter bushing from said lower end of said tester pipe nipple, then positioning a central aperture of said swivel plate on said pipe nipple, the diameter of said swivel plate central aperture being larger than the diameter of said pipe nipple to provide loose swiveling movement of said swivel plate on said pipe nipple, and then remounting said adapter bushing on said lower end of said pipe nipple whereby said adapter bushing retains said swivel plate on said pipe nipple.

3. A method according to claim 2, wherein said tapping tee has a vertical riser portion and a lateral branch portion extending substantially transversely of said pipeline, and said tester adapter bushing is connected on said riser portion of the tee, said method further comprising swiveling said swivel plate on said pipe nipple to an angular location with respect to the transverse direction of the pipeline to position its said opposite end portions respectively and diagonally on either side of the longitudinal extension of said lateral branch portion of the tapping tee, placing an annular saddle plate against said opposite side of the pipeline in directly opposite relation to said tapping tee and said bushing thereon, said saddle plate being angled centrally of its length thereby providing opposite saddle plate end portions extending angularly and projecting outward of the respective opposite sides of said pipeline, and connecting and tightening said swivel plate and said saddle plate using respective rods connecting each said swivel plate end portion with one of said saddle plate end portions aligned therewith on said opposite side of the pipeline.

4. A method according to claim 3, wherein each of said rods has a threaded end and an opposite end having a crowsfoot thereon, and each of said end portions of said swivel plate and said saddle plate has a rod-receiving aperture therein, said aperture in each of said swivel plate end portions being aligned with a corresponding one of said apertures in said saddle plate end portion on the opposite side of the pipeline, and said method further comprises passing said opposite end of each said rod through one of said saddle plate end portion apertures and into connecting engagement therewith of its said crowsfoot and passing said threaded end of each said rod through said corresponding one of said swivel plate end portion apertures, and tightening a wingnut on each of said threaded ends of said rods.

5. A method according to claim 4, wherein said pipeline is a gas main lying within a trench, and said tapping tee is a service line tapping tee.

6. A safety device restraining a pressure tester adapter bushing against blow off from its threaded connection on a tapping tee of a pipeline during pressure testing of the pipeline, said adapter bushing having an outer top surface and being mounted on the lower end of a tester pipe nipple, said safety device comprising a swivel plate mounted on said tester pipe nipple in engagement with said adapter bushing outer surface, said swivel plate having opposite end portions each having a connection aperture therein, said swivel plate end portions respectively extending diagonally and generally transversely of said pipeline whereby said connection apertures therein are respectively positioned outwardly of the respective opposite sides of said pipeline on either side of said tapping tee, an angular saddle plate having an elongated angular central portion aligned in the longitudinal direction of said pipeline and disposed against the side of said pipeline in directly opposite relation to said tapping tee, said saddle plate further having opposite saddle plate end portions each having a connection aperture therein, said respective connection apertures being longitudinally spaced from each other whereby said connection apertures are respectively positioned outwardly of said opposite sides of said pipeline and respectively in substantial alignment with one of said diagonally positioned swivel plate end portion connection apertures, and connection means extending through the respective of said aligned swivel plate and saddle plate end portion connection apertures and tightly securing said swivel plate and said saddle plate whereby said swivel plate presses against said outer top surface of said pressure tester adapter bushing and restrains said bushing against blow off from its said connection on said tapping tee.

7. A safety device restraining a pressure tester adapter bushing according to claim 6, wherein said connection means comprises a pair of connection rods, each said rod having a threaded end and an opposite end having a crowsfoot thereon and passing through and connecting one of said aligned swivel plate and saddle plate end portion connection apertures with its said crowsfoot engaging the saddle plate end portion connection aperture and its said threaded end passing through said aligned swivel plate end portion connection aperture, and respective nuts threadedly engaging each of said rod threaded ends and tightened substantially against said swivel plate.

8. A safety device restraining a pressure tester adapter bushing according to claim 6, wherein said connection means comprises a wire rope passed sequentially through all of said aligned swivel plate and saddle plate end portion connection apertures from one of said swivel plate end portion apertures to the other of said swivel plate end portion apertures, said wire rope having first and second ends and a stop on its said first end preventing its said first end from passing through said one of said swivel plate end portion apertures and a threaded rod on its said second end, said threaded rod passing through said other swivel plate end portion aperture and having a threaded wingnut thereon which is tightened substantially against said swivel plate.

9. A kit of parts for assembly to secure the adapter bushing of a pressure tester in engagement with the riser portion of a tapping tee on a pipeline, said tapping tee further having a branch portion extending laterally of said pipeline, said kit of parts comprising an elongated swivel plate having a central aperture for loosely mounting the swivel plate on a tester pipe nipple on which said adapter bushing is mounted, said swivel plate having opposite end portions each having a connection aperture therein, said swivel plate connection apertures being spaced from each other a distance which is substantially greater than the diameter of said pipeline; an angular saddle plate for placing against the side of said pipeline which is opposite said tapping tee and having a central longitudinal line of bend providing opposite end portions of said saddle plate having an included angle of less than 180° therebetween, each said saddle plate opposite end portion having a connection aperture therein, said saddle plate end portion connection apertures being spaced from each other a distance across said longitudinal line of bend which is greater than the diameter of said pipeline and longitudinally a distance which is greater than the diameter of said branch portion of said tapping tee; and means for connecting said swivel plate connection apertures and said saddle plate connection apertures for tightening said swivel plate and said saddle plate respectively on and against said tester adapter bushing and said side of said pipeline opposite said tapping tee.

10. A kit of parts according to claim 9, wherein said connection means comprises a pair of connection rods each having a threaded end to be received through one of said swivel plate end portion connection apertures and an opposite end having means for its connection to one of said saddle plate end portion connection apertures, and a pair of threaded nuts respectively for threading on to said threaded end of one of said connection rods.

11. A kit of parts according to claim 10, wherein said means on said opposite end of each said connection rod comprises a crowsfoot for connection to said saddle plate through one of said saddle plate end portion connection apertures.

12. A kit of parts according to claim 11, wherein said pair of threaded nuts comprises a pair of wingnuts, and which further comprises a pair of washers respectively for mounting with one of said wingnuts on said threaded end of one of said connection rods.

13. A kit of parts according to claim 12, wherein each said swivel plate end portion has a second connection aperture therein, said swivel plate second connection apertures being spaced from each other a distance which is greater than the diameter of a second pipeline whose diameter is smaller than said diameter of the first said pipeline, and each said saddle plate end portion has a second connection aperture therein, said saddle plate second connection apertures being spaced from each other a distance across said longitudinal line of bend which is greater than said diameter of said second pipeline and longitudinally a distance which is greater than said diameter of said branch portion of said tapping tee.

14. A kit of parts according to claim 9, wherein said connection means comprises a wire rope having first and second ends and a diameter to be received through all of said swivel plate and saddle plate connection apertures, said first end of said wire rope having a stop thereon preventing said first end from passing through one of said swivel plate end portion connection apertures, said second end of said wire rope having a straight threaded shank thereon to be received through all of said swivel plate and saddle plate connection apertures, and a threaded nut for threading on to said straight threaded shank.

* * * * *